United States Patent [19]

Doyle

[11] Patent Number: 5,506,577
[45] Date of Patent: Apr. 9, 1996

[54] SYNCHRONIZER FOR PULSE CODE MODULATION TELEMETRY

[75] Inventor: Mark R. Doyle, Houston, Tex.

[73] Assignee: Western Atlas International, Inc., Houston, Tex.

[21] Appl. No.: 298,654

[22] Filed: Aug. 31, 1994

[51] Int. Cl.$^6$ .................................................. G08C 19/16
[52] U.S. Cl. ............................. 340/870.01; 340/870.05; 340/825.14; 340/825.2; 375/239; 375/354
[58] Field of Search ........................ 340/870.01, 870.04, 340/870.05, 870.18, 870.34, 870.14, 825.14, 825.2; 455/226.1; 375/239, 316, 344, 354, 362

[56] References Cited

U.S. PATENT DOCUMENTS

| | | | |
|---|---|---|---|
| 4,847,872 | 7/1989 | Hespelt et al. | 375/344 |
| 4,855,735 | 8/1989 | Webb et al. | 340/870.14 |
| 5,016,005 | 5/1991 | Shaw et al. | 340/870.01 |
| 5,177,740 | 1/1993 | Toy et al. | 340/825.14 |
| 5,416,800 | 5/1995 | Frank | 375/239 |

Primary Examiner—Brent A. Swarthout
Assistant Examiner—Andrew Hill
Attorney, Agent, or Firm—Richard A. Fagin

[57] ABSTRACT

The invention is a method of synchronizing a digital telemetry receiver to a digital telemetry transmitter. The method includes the steps of initializing the sampling period of the receiver, measuring the detection time of each signal event detected by the receiver relative to a time window based on the sampling period, accumulating statistics representing the detection times of each of the events, and calculating a refined sampling period based on a linear regression fit of the actual detection time of each event.

7 Claims, 2 Drawing Sheets

SYNCHRONIZER FOR PULSE CODE MODULATION TELEMETRY

BACKGROUND OF THE INVENTION

1. Field of the Invention

The present invention is related to the field of digital electronic data telemetry systems. More specifically, the invention is related to methods of maintaining the synchronization of a transmitter and a receiver in a digital electronic telemetry system.

2. Discussion of the Relevant Art

Digital electronic telemetry systems are known in the art. Digital electronic telemetry systems are used to send information over a significant distance in the form of an electrical signal which comprises electrical voltage levels corresponding to binary numbers. Binary numbers are typically used in digital telemetry because they are composed entirely of ones and zeroes. Electrical voltage representations of ones and zeroes are relatively easy to receive and interpret, and are relatively resistant to corruption by noise, particularly when compared with analog telemetry signals.

Applications for digital electronic telemetry systems include transmission of measurements made by instruments such as oil well logging tools over a length of electrical cable. Oil well logging tools can include sensors which make measurements of physical parameters in a wellbore such as pressure and temperature. Typically, the sensors generate an output which can be in the form of an analog signal. The analog signal is converted into a series of binary numbers which represent the magnitude of the analog signal at spaced apart time intervals. The series of binary numbers is applied to a telemetry transmitter. The telemetry transmitter typically is programmed to send a plurality of such series of binary numbers, each series representing analog signal magnitudes of a corresponding sensor. The plurality of series are arranged so that each series typically is located at a predetemined ordinal position in a digital message called a telemetry sequence. Each time a telemetry sequence is transmitted, new series representing later sampled magnitudes of sensor signals can be transmitted in that sequence.

Each telemetry sequence typically starts with a predetermined series of binary numbers known as a synchronization pattern. The synchronization pattern serves two functions. First, detection of the synchronization pattern by a telemetry receiver indicates to the receiver that subsequent binary values detected from the telemetry sequence represent a new series of sensor magnitudes located in their respective predetermined positions. This enables the receiver to assign subsequently decoded values to the intended output destination for interpretation. Second, the synchronization pattern can be used to determine the exact transmitter frequency. This is particularly important in oil well logging tools since the telemetry transmitter, which forms part of a tool string, typically will be lowered into the wellbore and therefore can be exposed to elevated temperatures. Exposing the transmitter to different temperatures can cause changes in the operating frequency of the telemetry transmitter. Changes in the operating frequency can cause errors in decoding of the telemetry sequence by the receiver if the receiver frequency does not remain precisely matched to the transmitter frequency.

There are several methods known in the art for modulating the output of the transmitter to represent binary ones and zeroes. The form of modulation is referred to as the data encoding system. Data encoding systems typically used for telemetry in oil well logging tools, such as "alternate mark inversion" or AMI, can be susceptible to decoding error due to frequency mismatch between the transmitter and the receiver, because AMI and other encoding systems were principally designed for other telemetry uses in which the transmitter frequency was not subject to the range of variation to which the transmitter in oil well logging tools is susceptible. AMI telemetry, for example, codes a binary "one" as a non-zero signal level of substantially constant amplitude and at a much higher level than the ambient noise in the telemetry channel, and codes a "zero" as a zero signal level. Any binary "one" must be of a polarity opposite to the immediately previous "one" transmitted in the telemetry sequence. Alternating polarity of the "ones" maintains an average signal level in the telemetry channel, which in an oil well logging tool string is the cable, of close to zero.

Correct AMI telemetry decoding depends on the receiver sampling the telemetry signal at the proper position in time for each binary number. For example, a series of sixteen contiguous "zero" values in the telemetry sequence would be transmitted as a zero level signal for a period of time equal to sixteen times the period associated with the transmission of a single "zero". Since there are no time position reference markers within this particular telemetry sequence, other than the synchronization pattern at the beginning of the telemetry sequence, a slight mismatch in frequency between the transmitter and the receiver can cause misinterpretation of the received binary numbers. Misinterpretation of the received binary numbers can take forms such as the decoded sensor values being numerically incorrect, or decoded values being attributed to the wrong sensor.

A method of matching the frequency of the receiver to the frequency of the transmitter is known in the art. The method known in the art comprises transmitting a synchronization pattern consisting essentially of all binary "ones" to enable precise determination of the transmitter frequency by measuring the time between successive detections of the "ones". The frequency of the receiver is then adjusted by using an analog phase locked loop to match the transmitter frequency after detecting each synchronization pattern.

The method known in the art for matching the receiver frequency to the transmitter frequency is susceptible to loss of synchronization, and subsequent loss of data, even if small amounts of noise are present in the telemetry channel. For example, during synchronization, the receiver is programmed to search for voltage levels exceeding a detection threshold within a predetermined time window. The window has a primary duration functionally related to the previously adjusted telemetry frequency, and has a predetermined error margin by which the time of a subsequent detection can exceed, or fall short of, the primary duration. If a noise event occurring at one edge of the time window is detected, rather than a signal event occurring more near the center of the window, it is possible for subsequent detection windows, which are re-timed subsequent to the detection of events in the synchronization pattern, to be reset for time intervals which will miss the probable time position of later signal events, leading to loss of synchronization.

It is an object of the present invention to provide a synchronization method for pulse-based telemetry which is more reliable in the presence of noise in the telemetry channel.

It is a further object of the present invention to provide a means for digitally adjusting the telemetry receiver frequency, which can improve the synchronization by eliminating the drift which is present in analog telemetry frequency adjustment circuitry.

SUMMARY OF THE INVENTION

The present invention is a method for synchronizing a digital telemetry receiver to a digital telemetry transmitter. The method includes the steps of: detecting signal events in the telemetry receiver; calculating the detection time of each event relative to a predetermined time origin; calculating detection time statistics from all events detected by updating a detection time storage buffer until the number of events detected equals the number of events in a predetermined signal pattern; and calculating the telemetry frequency by linear regression analysis of the detection time statistics of all the detected events.

DESCRIPTION OF THE PREFERRED EMBODIMENT

Figure 1:
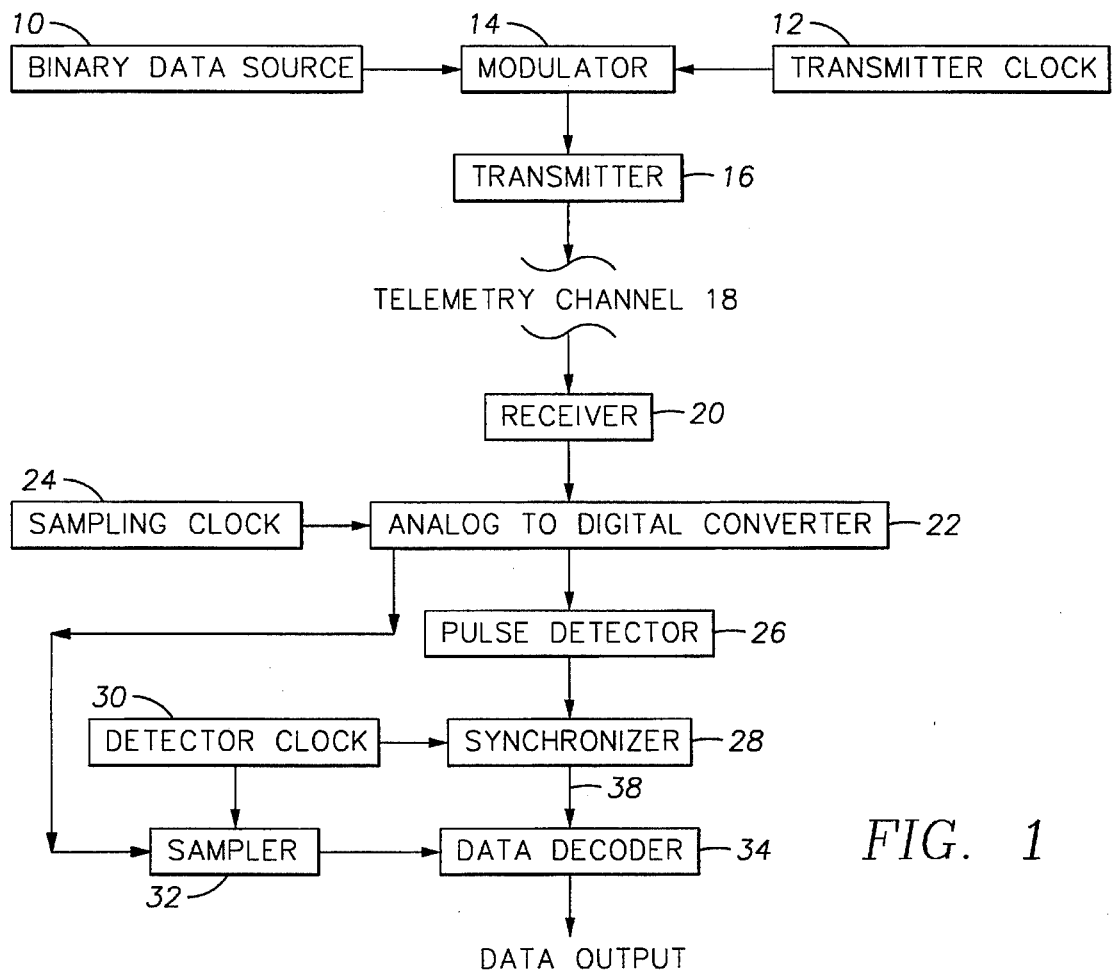
FIG. 1 shows a complete telemetry system as it is typically used with an oil well logging tool string.

FIG. 1 shows the components of a telemetry system as typically used in an oil well logging tool string. A binary data source 10 can be the output of an analog-to-digital converter and a multiplexer (not shown). The source 10 is composed of binary numbers representing the outputs of various sensors (not shown). The source 10 operates a modulator 14 which varies the output signal level of a transmitter 16, so that a non-zero output level represents a binary "one", and a zero output level represents a binary "zero". The operating frequency of the telemetry is determined by a transmitter clock 12, which in this embodiment can operate at 8 kHz, however other operating frequencies, including much higher frequencies, can carry the telemetry of the present invention. A telemetry channel 18 connects the transmitter 16 to a receiver 20. The channel 18 in this embodiment is a well logging cable having at least one insulated electrical conductor.

The receiver 20 amplifies and bandpass filters the signal arriving from the channel 18. The signal is digitized in an analog-to-digital converter, or ADC 22. The ADC 22 is used so that time and voltage level measurements of the signal can all be performed digitally. The ADC 22 samples the received signal at a rate determined by a sampling clock 24, which in this embodiment operates at about 100 kHz. To avoid aliasing, the sampling clock 24 should operate at a frequency at least twice the highest frequency component of the transmitter 16. A pulse detector 26 samples the output from the ADC 22, and transmits an indication of the time of detection when the output from the ADC 22 exceeds a predetermined detection threshold. In the present embodiment the pulse detector 26 can be a logical switch which compares the ADC 22 output number with a predetermined number.

A detector clock 30 controls the duration of spaced-apart time intervals which are used as a time reference for control of a sampler 32.

Upon activating the system, the spaced-apart time intervals from the detector clock 30 have a duration which is inversely proportional to the expected initial frequency of the transmitter 16. As will be further explained, the detector clock 30 is adjusted so that the duration of the spaced apart-time intervals match the calculated frequency of the transmitter 16.

When a complete synchronization, or sync, pattern is detected, a sync detect indication 38 is sent to a data decoder 34, so that the remainder of the telemetry message is decoded into the desired data. Binary numbers from the ADC 22 pass through a sampler 32 which samples the data portion of the telemetry message. The output of the sampler 32 is routed to a data decoder 34 which decodes the telemetry message into a binary bit stream which is substantially the same as the bit stream output of the binary data source 10.

Figure 2:
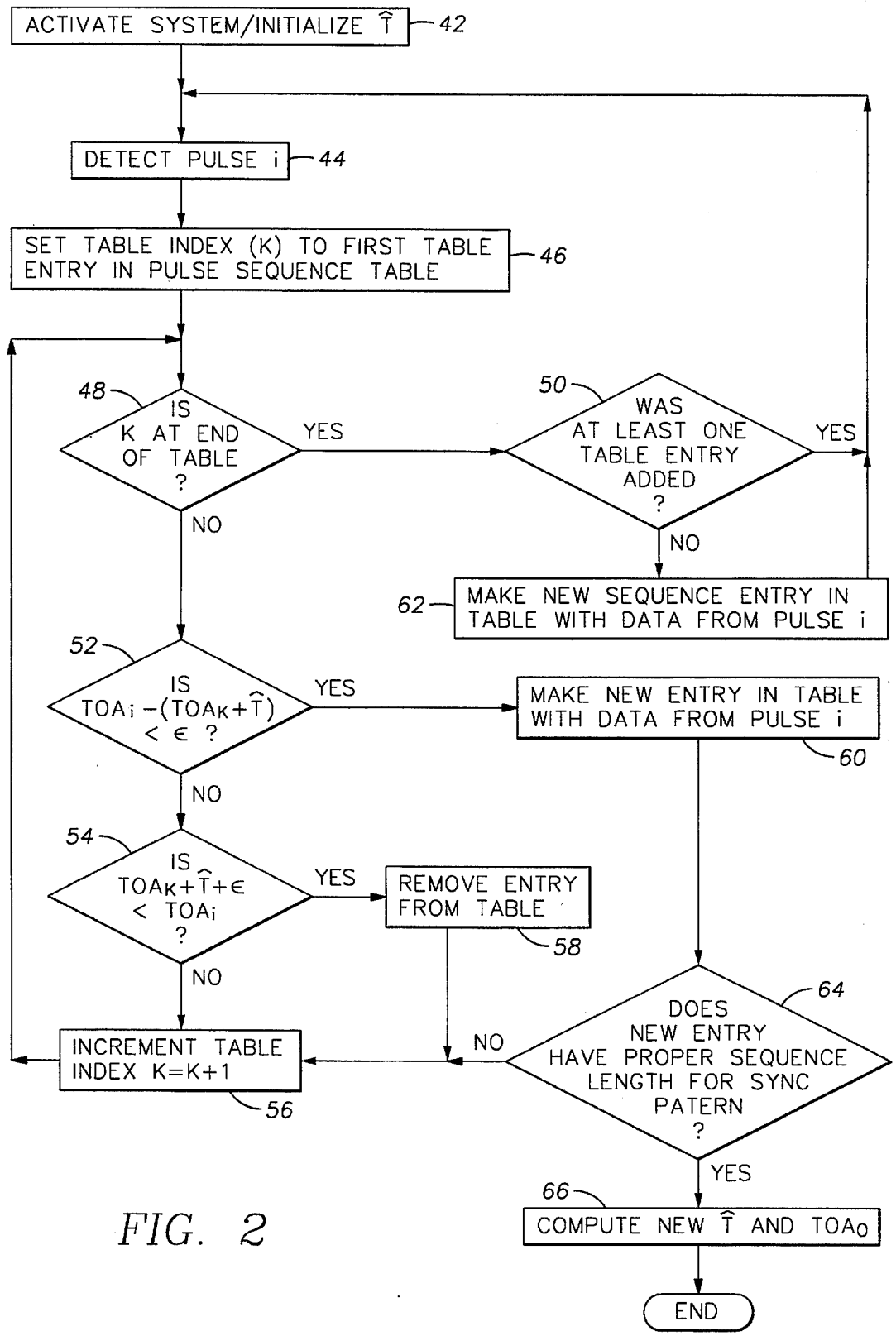
FIG. 2 is a flow chart which describes the operating logic of the synchronizer during detection of the synchronization pattern of a telemetry sequence.

FIG. 2 describes the logic functions of the synchronizer (shown as 28 in FIG. 1) and how the sampling interval of the detector clock (shown as 30 in FIG. 1) is adjusted. In the present embodiment the logic functions of the synchronizer 28, the sampler 32, and the data decoder 34 can be performed by a digital signal precessing (DSP) chip such as one manufactured by Analog Devices Inc., sold under the designation model number 21020.

The transmitter 16 signal comprises detectable events, or pulses. The pulses are spaced apart in time by an interval, represented by the symbol T, which is functionally related to the frequency of the transmitter 16. The detection, or arrival time, called TOA, of any individual pulse relative to any preselected reference time origin is a linear function of T. The reference time origin can be selected to match the time of detection of a pulse arbitrarily assigned to an initial time interval, or time interval "0". The time of detection, or time of arrival of this pulse is then called $TOA_o$. The arrival time of any subsequent pulses, each of which may be individually identified with a numerical identifier called an interval index, "i", can be directly calculated by the expression:

$$TOA_i = TOA_o + (i \times T) \quad (1)$$

The synchronizer 28 accumulates time of arrival statistics from detections of individual pulses so that more accurate estimates of T can be calculated by linear regression of the timing data from a plurality of detected events. The revised value of T, determined by linear regression of the timing statistics of event detections, is calculated by the formula:

$$T = \frac{\Sigma(i \times TOA_i) - \frac{1}{N} \Sigma(i) \times \Sigma(TOA_i)}{\Sigma(i^2) - \frac{1}{N} \times (\Sigma i)^2} \quad (2)$$

and the revised value of time origin is calculated by:

$$TOA_0 = \frac{\Sigma(TOA_i) - T \times \Sigma(i)}{N} \quad (3)$$

N in this expression is the total number of events for which timing data have been accumulated. The timing data are accumulated in a sequence table, or buffer, forming part of the synchronizer 28.

When the system is first activated, as shown at 42, the detector clock 30 is programmed with a predetermined initial sampling interval which is functionally related to the expected initial frequency of the transmitter clock (shown as 12 in FIG. 1). When a pulse is detected, shown at 44, in the pulse detector (shown as 26 in FIG. 1), a sequence table in the synchronizer 28, which in this embodiment is a logical buffer, is set so that its pointer is returned to the first entry in the table, as shown at 46. Shown at 48, the position of the table pointer relative to the end of the table is determined. If the pointer is positioned beyond the end, or last entry, of the table, a determination is made as to whether at least one new table entry was made since the most current pulse detection, as shown at 50. If no table entries have been made for the current pulse detection, shown as NO at 50, then a new table entry is made, as shown at 62, comprising the timing data from the detected pulse. The new table entry comprises: a start of sequence time equal to TOA of the detected event; a time of the last event equal to the TOA of the currently detected pulse; a sequence length equal to one; a sum of TOA's equal to TOA of the currently detected pulse; a sum of TOA multiplied by the pulse interval index of zero; a sum of indices equal to zero; and a sum of squared indices equal to zero.

If the table index is not at the end of the table, shown as NO at 48, then a comparison of the pulse detection time, or TOA, relative to the expected detection time is made. The expected detection time is calculated by adding the known predetermined number of intervals of the detector clock 30 to the TOA of the prior entry in the table. The actual pulse detection time is subtracted from the expected arrival time, and the result is compared with a predetermined acceptance window or error band, as shown at 52. If the detection occurs within the acceptance window, a new table entry is made, as shown at 60.

The new table entry, as shown at 60, is created by combining information from the table entry which yields an actual TOA which falls within the acceptance window, as shown at 52, and the information from the current detection, so that the terms required for computing the linear regression are updated. The interval index, "i", of the current detection is calculated by solving for "i" as the integer nearest the solution to:

$$i = \frac{TOA - TOA_0}{T} \quad (4)$$

where the value of the table entry for time of the start of the sequence is the time value used for $TOA_o$. From the calculated value of index "i" and the TOA of the currently detected event, the new table entry is created that stores: the start of the sequence of the matching entry as the time of the start of the sequence, as shown at 52; the current detection TOA; a sequence length equal to the sequence length of the matching entry plus one; and accumulated linear regression statistics of the matching entry and the current detection entry.

If the detection occurs at a time beyond the end of the acceptance window, shown as YES at 54, then the table entry with the prior detection data is removed from the table, shown at 58. This step is performed because a detection which occurs beyond the end of the acceptance window indicates that no subsequent entry, which must necessarily occur at a later time, could occur within the acceptance window of the table entry which is to be deleted.

Entries that are removed from the table could have been created, for example, if a noise event were detected and its associated timing data were entered into the table.

If the time of the detection of the particular pulse is within the acceptance window, or subsequent to removal from the table of the data from an erroneous detection, the table pointer is incremented to the next position, as shown at 56, and the comparison sequence is repeated until the comparison indicates that the pointer has exceeded the end of the table, shown as YES at 48.

After each new table entry is added into the table, the total number of pulse detections contributing to that particular entry in the table is compared with a predetermined number of pulse detections which can be identified as a sync pattern, as shown at 64. The predetermined number of detections in the sync pattern forms part of the initial programming of the synchronizer 28, and the sync pattern can comprise any predetermined number of pulse detections. The sync pattern can comprise contiguous pulse events, but it is contemplated that other sync patterns can comprise non-contiguous pulses. In the present embodiment, the sync pattern has a length of sixteen contiguous pulses each representing a binary value of "one".

If a sync pattern is determined to have been detected, shown as YES at 64, then a new detector clock 30 sampling interval is calculated by linear regression, also called least squares fit, of the cumulative timing data stored in the sequence table, as shown at 66. The output of the linear regression is a new value for the sampling interval for the detector clock 30. The linear regression calculation of the sampling interval has the advantage of being relatively insensitive to false detections, such as when a binary one is misread as a binary zero.

As shown as NO at 64, if the number of pulse detections is not the same as the predetermined number corresponding to a sync pattern, the table pointer is incremented, and the comparison is repeated as shown at 48.

If a sync pattern is detected, a data detector (shown as 34 in FIG. 1), is initialized to decode the binary numbers subsequently output from a sampler (shown as 32 in FIG. 1). The sampler 32 decimates the output from the ADC 22, so that the resulting sample interval is substantially the same as the sample interval corresponding to the frequency of the transmitter clock 12.

The decoder 34 assigns a binary value of zero or one to the output, depending on the signal level output from the sampler 32.

Figure 3:
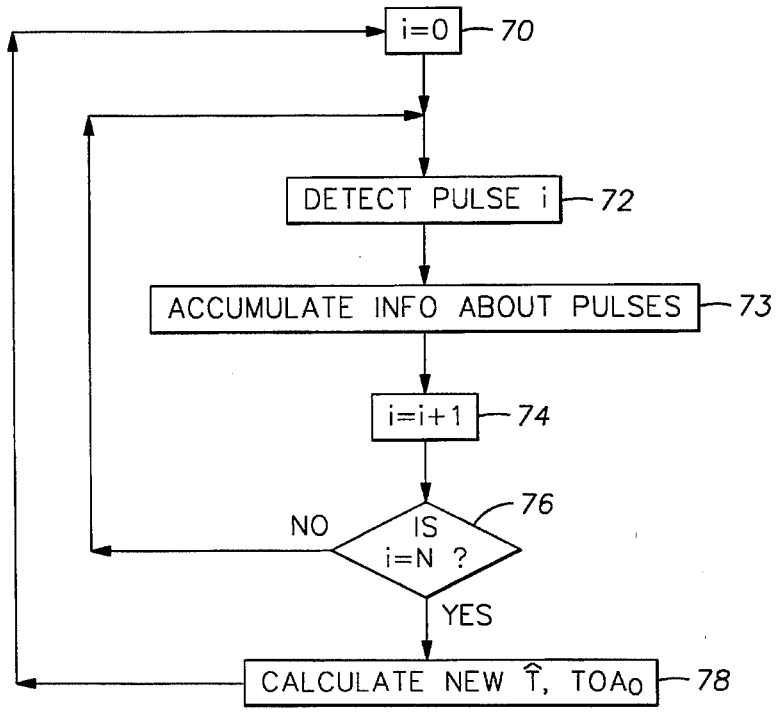
FIG. 3 is a flow chart which describes the operating logic of the synchronizer during detection of data sequences in the telemetry sequence.

FIG. 3 shows a method of using timing information from data in the telemetry message to adjust the detector clock 30 sampling interval to match the transmitter clock 12 frequency after a sync pattern has been detected, or during transmission of data if an encoding system is used that does not comprise a sync pattern. At 70, an event counter in a data storage buffer is reset to an event count of zero. Pulses are detected at 72, and timing information from each detected pulse is stored in the buffer, as shown at 73. The event counter is incremented as shown at 74 after each detection. The event counter, at 76, is compared to a predetermined number representing a data word or message length value. In the present embodiment, the message comprises sixteen bit binary numbers, so the predetermined number is sixteen. At 76, if the event counter shows less than the predetermined number, the next pulse is detected and its associated timing data are accumulated. If the event count is equal to the predetermined number, the timing data are then used to compute a new detector clock 30 sampling interval, as shown at 78.

I claim:

1. A method of synchronizing a digital telemetry receiver to a digital telemetry transmitter comprising the steps of:

operating said receiver at an initial frequency, said initial frequency being approximately equal to an initial operating frequency of said transmitter and calculating a sampling interval inversely proportional to said initial frequency;

causing said receiver to detect a plurality of signal events transmitted by said transmitter;

measuring a time of detection of each of said plurality of signal events;

calculating a linear regression of said time of detection of each of said plurality of events relative to said sampling interval;

calculating an updated operating frequency of said transmitter from said linear regression; and adjusting said sampling interval to be inversely proportional to said updated operating frequency of said transmitter.

2. The method as defined in claim 1 wherein said signal events are amplitude modulated and represent information comprising at least one digital bit.

3. The method as defined in claim 1 wherein said transmitter is caused to transmit a predetermined signal pattern.

4. The method as defined in claim 3 wherein said predetermined signal pattern is used to indicate the beginning of a telemetry message.

5. The method as defined in claim 1 wherein detection of each of said events by said receiver generates an entry in a data table, said entry comprising: said time of detection; a sequence length; a sum of said time of detection of each of said plurality of events; a sum of a number representing the ordinal position of each of said plurality of events; the sum of the square of said number, whereby said entry is used to calculate said linear regression.

6. The method as defined in claim 5 wherein said entry further comprises an indicator of the correspondence between said plurality of events and a predetermined signal pattern.

7. The method as defined in claim 1 wherein said initial operating frequency of said transmitter is determined by the operating speed of a clock operatively connected to said transmitter.

* * * * *